3,026,326
Patented Mar. 20, 1962

3,026,326
2-TRICYANOVINYL-AZOMETHINES AND
METHOD OF PREPARING THEM
Blaine Chase McKusick and John Richard Roland, Wilmington, Del., assignors to E. I. du Pont de Nemours and Company, Wilmington, Del., a corporation of Delaware
No Drawing. Filed May 1, 1958, Ser. No. 732,129
3 Claims. (Cl. 260—326.5)

This invention relates to a new class of tricyanovinyl dyes and to a process for their preparation.

In U.S. Patents 2,762,810 and 2,762,833, there are shown processes for preparing C-tricyanovinyl compounds, particularly C-tricyanovinyl aromatic amines and C-tricyanovinyl phenols. These C-tricyanovinyl compounds are highly colored and are useful for dyeing such materials as polyacrylonitrile and polyethylene terephthalate fibers when applied from neutral or acidic media. It is highly desirable to have dyes which are stable for application from alkaline media.

An object of the present invention is to provide a new class of tricyanovinyl dyes which are characterized by improved stability for application under alkaline conditions. A further object is to provide methods for preparing such dyes. Other objects will be apparent from the description of the invention given hereafter.

The above objects are accomplished by preparing a new class of dyes, the 2-tricyanovinylazomethines, by reacting tetracyanoethylene with selected (2-hydrogen)-azomethines. Following the customary precedence of atoms in numbering an organic compound, the nitrogen atom of the azomethine is numbered one and the carbon atom is numbered two.

The preferred products of this invention can be represented by the formula:

$$C(CN)_2=C(CN)-\underset{R}{C}=N-X$$

where R is a member of the class consisting of hydrogen, alkyl, cycloalkyl, aralkyl, aryl, substituted aryl and dialkylamino, and X is of the class consisting of hydroxy, alkoxy, aralkoxy, aryl and amino. Particularly preferred dyes of this class are those in which R is alkyl, cycloalkyl, aralkyl or aryl and substituted aryl and X is aryl or amino.

It will be understood that the term "amino" includes the recognized substituted amino groups such as alkylamino, arylamino (i.e., anilino), dialkylamino and N-alkyl-N-arylamino. Other substituted aminos which are operable are ureido, thioureido and guanidino.

The aryl moieties in the above definitions include carbocyclic aryl such as phenyl, naphthyl and anthryl. Also operable are heterocyclic aryl such as thienyl, pyrrolyl, indolyl, furyl, oxazolyl, pyridyl and quinolyl, and substituted derivatives of these groups.

Substituents on the radicals in R and X above which are particularly useful in intensifying the color of the 2-tricyanovinylazomethines include $-NY_2$, $-NHY$, $-OY$, $-SO_3H$, $-SO_3Y$, $-COOH$, $-COOY$, $-NO_2$, $-CN$ and halogens such as $-F$, $-Cl$ and $-Br$ where Y is hydrocarbon, i.e., alkyl, cycloalkyl, aryl or aralkyl.

Many of the products of this invention can be prepared by the process:

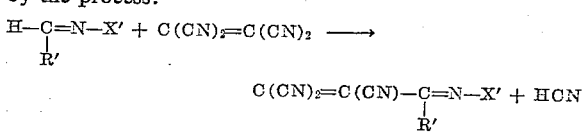

in which R' and X' are like R and X respectively above except that any aryl moieties in X' are 1,4-arylene groups, and any furyl or pyrryl moieties in R' are 2,5-furylene or 2,5-pyrrylene. For example, if the respective lower numbered position, that is, the 1-position of the arylene group or the 2-position of the furylene or pyrrylene groups, represents the bond from carbon of the aryl group to the azomethine carbon or to the azomethine nitrogen, the higher numbered position is occupied by a hydrocarbyl group (alkyl, cycloalkyl, aralkyl or aryl) or one of the substituents shown above. In my copending application Serial No. 732,130, filed of even date herewith, it is shown that when hydrogen occupies the respective higher numbered position in an aryl moiety in a starting material otherwise similar to the above, the tricyanovinyl group enters said position instead of at the 2-position on the azomethine group. Products of the present invention, i.e., 2-tricyanovinylazomethines, containing hydrogen in the respective higher numbered position of an aryl moiety as above are prepared by indirect methods. For example, benzaldehyde O-methyloxime reacts with tetracyanoethylene to yield 1-methoxy-2-phenyl-2-tricyanovinylazomethine which in turn can be treated with phenylhydrazine to obtain 1-anilino-2-phenyl-2-tricyanovinylazomethine.

Unsubstituted 2-tricyanovinylazomethine, $$C(CN)_2=C(CN)-CH=NH$$

(i.e., where X and R are hydrogen) is a dye which tends to combine with itself to form a trimer or higher polymers. These materials have low solubility. It is to be understood that the preferred dyes of this invention are those of the above formula with the proviso that R and X are not both hydrogen at the same time.

The reaction of this invention can be carried out by bringing together tetracyanoethylene and one of the selected (2-hydrogen)azomethines for an extended period of time, say, from about one minute up to 24 hours or more, depending on the temperature employed. The process can be carried out over a wide range of temperatures from 0° C. to 150° C. and above. It is more convenient to employ a liquid diluent which is chemically inert to the reactants and products, since this facilitates carrying out the reaction at room temperature. When it is desired to complete the reaction in a minimum time, it is convenient to heat the reaction mixture. Preferred reaction temperatures are in the range of 25–60° C. Pressure is not a critical factor in this process, and atmospheric pressure is accordingly preferred.

As liquid diluents for the practice of this invention there can be used N,N-dimethylformamide, N,N-diethylformamide, N-methylformanilide, N-methylformamide, formamide, N-methyl-N-ethylacetamide, N,N-dimethylacetamide, N,N-diethylacetamide, tetramethylurea, tetraethylurea, pyridine, dimethylsulfoxide and mixtures of these liquids. The dialkyl lower alkanoamides are the preferred class of solvents.

For practical yields of dyes, it is preferred to employ approximately equimolar quantities of tetracyanoethylene and the (2-hydrogen)azomethine. However, the reaction will take place when the reactants are employed in any proportion, and molar ratios within the range of 1:2 to 2:1 are preferred.

In the following examples parts are by weight unless otherwise indicated. Example III represents a preferred embodiment of the invention.

EXAMPLE I

About five parts each of p-methoxyphenyl(p-methoxyphenylmethylene)amine and tetracyanoethylene are ground in a mortar and moistened with about 100 parts of dimethylformamide. The mixture turns green. The mixture is then warmed at 60–100° C. and the green color disappears, giving way to a strong yellow characteristic of 1,2 - di(p-methoxyphenyl) - 2 - tricyanovinylazomethine.

When a portion of the reaction mixture is treated with dimethylaniline, no red color is formed, indicating complete absence of tetracyanoethylene.

EXAMPLE II

About five parts each of p-chlorobenzaldehyde oxime and tetracyanoethylene are warmed in about 100 parts of dimethylformamide. 2-p-chlorophenyl-1-hydroxy-2-tricyanovinylazomethine forms as a pale red dye. Treatment of a portion of the reaction mixture with dimethylaniline shows that all the tetracyanoethylene has reacted.

EXAMPLE III p-Dimethylaminobenzaldehyde p-nitrophenylhydrazone (56 parts) and 21 parts of tetracyanoethylene are reacted in about 94 parts of dimethylformamide at 50° C. The reaction mixture is poured onto ice and allowed to stand overnight. The solid which separates is filtered and recrystallized from aqueous ethanol to yield 30 parts of 2 - p-dimethylaminophenyl-1-p-nitroanilino-2-tricyanovinylazomethine in the form of dark red crystals. An acetone solution of this dye is deep yellow and shows an absorption maximum at 420 millimicrons with a molecular extinction coefficient of 41,200.

*Analysis.*—Calc'd. for $C_{20}H_{15}O_2N_7$: C, 62.3; H, 3.89; N, 25.42. Found: C, 62.47; H, 4.89; N, 23.12.

EXAMPLE IV

About five parts each of 2-(p-dimethylaminobenzalamino)-3,4-dicyano-5-benzylthiopyrrole and tetracyanoethylene are warmed in about 100 parts of dimethylformamide. The reaction yields 1-(5-benzylthio-3,4-dicyano-2-pyrrolyl) - 2 - p-dimethylaminophenyl-2-tricyanovinylazomethine in the form of a brilliant orange-yellow dye.

EXAMPLE V

About five parts each of p-dimethylaminobenzaldehyde dimethylhydrazone and tetracyanoethylene are warmed at 50–60° C. in about 100 parts of dimethylformamide. 1-dimethylamino - 2 - p-dimethylaminophenyl-2-tricyanovinylazomethine is formed as a deep orange-red dye, and hydrogen cyanide is evolved. An acetone solution of this dye is a brilliant deep yellow in color.

EXAMPLE VI

About five parts each of p-dimethylaminobenzaldehyde O-methyloxime and tetracyanoethylene in about 200 parts of dimethylformamide are heated for about ten minutes. 2 - p-dimethylaminophenyl-1-methoxy-2-tricyanovinylazomethine forms as a deep yellow dye, and hydrogen cyanide is evolved.

EXAMPLE VII

A solution of 10.4 parts of p-dimethylaminobenzaldehydethiosemicarbazone in 20 parts of dimethylformamide is prepared and heated under 40° C. To this is added 6.4 parts of tetracyanoethylene over a period of about 30 minutes. The reaction mixture is cooled in ice, filtered, and the solid recrystallized from acetic acid. This yields 0.1 parts of 2-p-dimethylaminophenyl-1-thioureido-2-tricyanovinylazomethine in the form of yellow-orange crystals melting at 299–304° C. An acetone solution of this dye shows absorption maxima at 345, 367 and 473 millimicrons with molecular extinction coefficients of 21,000, 20,400 and 11,000, respectively.

*Analysis.*—Calc'd. for $C_{15}H_{13}SN_7$: C, 55.76; H, 4.03; N, 30.3. Found: C, 54.89; H, 4.61; N, 30.71.

EXAMPLE VIII

About 5 parts each of tetracyanoethylene and 2,5-bis(dimethylaminomethyleneamino)-3,4-dicyanothiophene are warmed at 60–80° C. in 10 parts of dimethylformamide. The resulting 1-(3,4-dicyano-5-dimethylaminomethyleneamino - 2 - thienyl) - 2 - dimethylamino-2-tricyanovinylazomethine separates as a deep orange dye.

EXAMPLE IX p-Dimethylaminobenzaldehyde (149 parts) is dissolved in 197 parts of ethanol containing 0.4 parts acetic acid. Methyl hydrazine (46 parts) is added and the mixture is heated at 60–90° C. until a precipitate of p-dimethylaminobenzaldehyde methylhydrazone is obtained. Five parts each of p-dimethylaminobenzaldehyde methylhydrazone and tetracyanoethylene are dissolved in 100 parts of dimethylformamide. Within a few seconds 2-p-dimethylaminophenyl-1-methylamino - 2 - tricyanovinylazomethine forms as a bright orange dye.

When the following (2-hydrogen)azomethine compounds are treated with tetracyanoethylene in dimethylformamide solution in the manner of Example III, the indicated 2-tricyanovinylazomethines are obtained.

*Table*

| (2-Hydrogen)azomethine Starting Material | 2-Tricyanovinylazomethine Product |
|---|---|
| 3-indoleacetaldehyde p-nitro-phenylhydrazone. | 2 - (3 - indolylmethyl) - 1 - p - nitro anilino - 2 - tricyanovinylazo - methine. |
| 3-indoleacetaldehyde semicarbazone. | 2 - (3 - indolylmethyl) - 2 - tricyanovinyl-1-ureidoazomethine. |
| 3-indoleacetaldehyde oxime. | 1-hydroxy-2-(3-indolylmethyl)-2-tricyanovinylazomethine. |
| 3-pyridinecarboxaldehyde oxime. | 1 - hydroxy - 2 - (3 - pyridyl) - 2 - tricyanovinylazomethine. |
| 2-pyridinecarboxaldehyde p-nitrophenylhydrazone. | 1 - p - nitroanilino - 2 - (2 - pyridyl) - 2-tricyanovinylazomethine. |
| glucose 2,4-dinitrophenylosazone. | 1 - (2,4 - dinitroanilino) - 2 - (1 - [2,4 - dinitrophenylhydrazono]-2,3,4,5-tetrahydroxyamyl) - 2 - tricyanovinylazomethine. |
| 4 - dimethylamino - 1 - naphthaldehyde p-chlorophenylhydrazone. | 1-p-chloroanilino-2-(4-dimethylamino-1-naphthyl)-2-tricyanovinylazomethine. |
| 2,4 - dimethoxybenzaldehyde p - tolylhydrazone. | 2 - (2,4 - dimethoxyphenyl) - 1 - p - methylanilino -2-tricyanovinyl- azomethine. |
| 2,4 - bisdimethylaminobenzaldehyde semicarbazone. | 2-(2,4-bisdimethylaminophenyl) - 2 - tricyanovinyl - 1 - ureidoazomethine. |
| p-dodecylbenzaldehyde oxime. | 2-(p-dodecylphenyl)-1-hydroxy-2-tricyanovinylazomethine. |
| 1 - p - nitroanilino - 2 - (1,3,3 - trimethyl - 2 - indolylidenemethyl) - azomethine. | 1-p-nitroanilino-2-tricyanovinyl-2 - (1,3,3 - trimethyl - 2 - indolylidenemethyl)azomethine. |
| hexahydrobenzaldehyde oxime. | 2 - cyclohexyl - 1 - hydroxy - 2 - tricyanovinylazomethine. |
| cyclopropanecarboxaldehyde thiosemicarbazone. | 2 - cyclopropyl - 1 - thioureido - 2 - tricyanovinylazomethine. |
| 1-guanidino-2-p-tolylazomethine. | 1 - guanidino - 2 - p - tolyl - 2 - tri - cyanovinylazomethine. |
| p-methylaminobenzaldehyde p-tolylhydrazone. | 2 - p - methylaminophenyl - 1 - p - methylanilino - 2 - tricyanovinyl- azomethine. |
| p-dibenzylaminobenzaldehyde semicarbazone. | 2-p- dibenzylaminophenyl - 2 - tricyanovinyl-1-ureidoazomethine. |
| p - (β - cyanoethylmethylamino) - benzaldehyde p-nitrophenylhydrazone. | 2-p-(β-cyanoethylmethylamino)- phenyl - 1 - p - nitroanilino - 2 - tricyanovinylazomethine. |
| p - (β - benzoyloxyethylmethyl - amino(benzaldehyde p-chlorophenylhydrazone. | 2 - p - (β - benzoyloxyethylmethyl amino)phenyl - 1 - p - chloroanilo- 2-tricyanovinylazomethine. |
| 4 - methoxybenzaldehyde - 3 - sulfonic acid p-nitrophenylhydrazone. | 2 - (4 - methoxy - 3 - sulfophenyl) - 1 - p-nitroanilino - 2 - tricyanovinyl- azomethine. |
| p-nitrophenylhydrazone of ethyl ester of benzaldehyde-o-sulfonic acid. | 2 - (2 - ethoxysulfonylphenyl) - 1 - p - nitroanilino - 2 - tricyanovinyl- azomethine. |
| terephthalaldehydic acid p-chlorophenylhydrazone. | 2-(p-carboxyphenyl) - 1 -p-chloro- anilino - 2 - tricyanovinylazo - methine. |
| p-nitrophenylhydrazone of methyl ester of terephthalaldehydic acid. | 2-p-(methoxycarbonyl)phenyl-1- p-nitroanilino - 2 - tricyanovinyl- azomethine. |
| quinoline - 2 - carboxaldehyde 2,4-dinitrophenylhydrazone. | 1 - (2,4 - dinitro)anilino - 2 - (2 - quinolyl) - 2 - tricyanovinylazo - methine. |
| isoxazole-3-carboxaldehyde p-nitrophenylhydrazone. | 2-(3-isoxazolyl)-1-p-nitroanilino-2- tricyanoazomethine. |
| p-tolualdehyde O-benzyloxime. | 1 - benzyloxy - 2 - p - tolyl - 2 - tri - cyanovinylazomethine. |
| p-bromobenzaldehyde semicarbazone. | 2-p-bromophenyl-2-tricyanovinyl- 1-ureidoazomethine. |
| formaldehyde p-nitrophenylhydrazone. | 1 - p - nitroanilino - 2 - tricyanovinyl azomethine. |
| butyraldehyde 2,4-dinitrophenylhydrazone. | 1 - (2,4 - dinitro)anilino - 2 - propyl - 2-tricyanovinylazomethine. |
| trifluoroacetaldehyde p - chlorophenylhydrazone. | 1-p-chloroanilino-2-tricyanovinyl- 2-trichloromethylazomethine. |
| benzaldehyde thiosemicarbazone. | 2 - phenyl - 1 - thioureido - 2 - tri - cyanovinylazomethine. |
| p-dimethylaminobenzaldehyde N-methyl-p-nitrophenylhydrazone. | 2-p-dimethylaminophenyl-1-(N- methyl - p - nitro)anilino - 2 - tri - cyanovinylazomethine. |
| 3-indolecarboxaldehyde oxime. | 1-hydroxy-2-(3-indolyl)-2-tri- cyanovinylazomethine. |

The compounds of this invention have been named as 2-tricyanovinylazomethines since this expression recites generically the whole structure which is common to all of these compounds. However, there are other methods for naming these compounds which might be equally satisfactory. For example, the products may be regarded as substituted amines, hydrazines, semicarbazides, etc. Thus, the product of Example I might be named (α-tricyanovinyl-p-methoxybenzylidene) - (p - methoxyphenyl)amine; the product of Example II might be named (p-chloro-α-tricyanovinylbenzylidene)hydroxylamine; the product of Example III might be named (α-tricyanovinyl-p-dimethylaminobenzylidene) - (p - nitrophenyl)hydrazine; and the product of Example IV might be named (p-dimethylamino-α-tricyanovinylbenzylidene)semicarbazide.

Since the tricyanovinyl group is common to all these compounds, it would also be suitable to name the products as derivatives of ethylenetricarbonitrile or of 2,3-dicyanocrotononitrile. Thus, the product of Example I might be named (α-p-methoxyphenylimino-p-methoxybenzyl) - ethylenetricarbonitrile or 2,3-dicyano-4-(p-methoxyphenyl)-4 - (p-methoxyphenylimino)crotononitrile; the product of Example II might be named (α-hydroximino - p - chlorobenzyl) - ethylenetricarbonitrile or 4-(p-chlorophenyl)-2,3-dicyano - 4 - hydroximinocrotononitrile; the product of Example III might be named (α-p-nitrophenylhydrazono - p-dimethylaminobenzyl)ethylenetricarbonitrile or 2,3-dicyano-4 - p-dimethylaminophenyl-4-(p-nitrophenylhydrazono)-crotononitrile; and the product of Example IV might be named (α-semicarbazono-p-dimethylaminobenzyl)ethylenetricarbonitrile or 2,3-dicyano-4-(p-dimethylaminophenyl)-4-semicarbazonocrotononitrile.

The use of the 2-tricyanovinylazomethines of this invention as dyes may be illustrated as follows:

DYEING EXAMPLE A

A dye bath is prepared by pouring a solution of 0.05 part of 2-p-dimethylaminophenyl-1 - p-nitroanilino - 2-tricyanovinylazomethine in 10 parts of acetone into a well-stirred solution of 200 parts of water and 50 parts of an aqueous solution of a sulfonated lignin dispersant ("Marasperse," Marathon Company) containing 0.001 part of dispersant per part of water. Swatches of cellulose acetate, cotton, polyethylene terephthalate, nylon, polyacrylonitrile, rayon, and wool fabrics are heated in the dye bath at 80–90°C. for one hour. The cellulose acetate is dyed a deep yellow color; cotton, pale yellow; polyethylene terephthalate, medium yellow; nylon, deep orange-brown; polyacrylonitrile, pale yellow; rayon, dull yellow; and wool, light orange-brown.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A compound having the formula

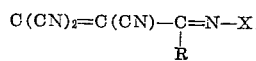

where R is a member of the class consisting of hydrogen, dialkylamino, alkyl, cycloalkyl, carbocyclic aralkyl, carbocyclic aryl and substituted carbocyclic aryl, wherein said substituents are selected from the group consisting of alkoxy, chloro, and dialkylamino; and X is of the class consisting of hydroxy, alkoxy, amino, carbocyclic aralkoxy, carbocyclic aryl, thiocarbamyl, thienyl and pyrryl, wherein any substituents on said aryl, pyrryl and thienyl are selected from the group consisting of cyano, alkoxy, and nitro.

2. Process which comprises reacting tetracyanoethylene with a (2-hydrogen)azomethine of the formula

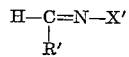

wherein R' is a member of the class consisting of hydrogen, dialkylamino, alkyl, cycloalkyl, carbocyclic aralkyl, and carbocyclic aryl, and substituted carbocyclic aryl wherein said substituents are selected from the group consisting of alkoxy, chloro, and dialkylamino; and X' is a member of the class consisting of hydroxy, amino, alkoxy, carbocyclic aralkoxy, carbocyclic aryl, thiocarbamyl, thienyl, and pyrryl, wherein any substituents on said aryl, pyrryl and thienyl, are selected from the group consisting of cyano, alkoxy and nitro, to yield a 2-tricyanovinylazomethine.

3. Process according to claim 2 wherein said reaction is effected in a liquid diluent chemically inert to tetracyanoethylene, to the (2-hydrogen)azomethine and to the resulting 2-tricyanovinylazomethine.

References Cited in the file of this patent

UNITED STATES PATENTS 2,719,861    Carboni _____ Oct. 4, 1955
2,762,832    Heckert _____ Sept. 11, 1956